Dec. 17, 1946.    C. W. CARROLL    2,412,673
ROTARY SHUTTER DRIVER
Filed April 12, 1944    3 Sheets-Sheet 1

CLARENCE W. CARROLL
INVENTOR

BY

ATTORNEYS

Dec. 17, 1946.   C. W. CARROLL   2,412,673
ROTARY SHUTTER DRIVER
Filed April 12, 1944   3 Sheets-Sheet 2

CLARENCE W. CARROLL
INVENTOR
BY
ATTORNEYS

Dec. 17, 1946.  C. W. CARROLL  2,412,673
ROTARY SHUTTER DRIVER
Filed April 12, 1944  3 Sheets-Sheet 3

CLARENCE W. CARROLL
INVENTOR

BY
ATTORNEYS

Patented Dec. 17, 1946

2,412,673

UNITED STATES PATENT OFFICE 2,412,673

ROTARY SHUTTER DRIVER

Clarence W. Carroll, Rochester, N. Y., assignor to Eastman Kodak Company, Rochester, N. Y., a corporation of New Jersey Application April 12, 1944, Serial No. 530,593

21 Claims. (Cl. 95—63)

This invention relates to camera shutters of the between-the-lens type. One object of my invention is to provide a simple type shutter driving and releasing mechanism. Another object of my invention is to provide a shutter mechanism with a drive which is capable of high speed. Another object of my invention is to provide a shutter with a single lever which may be used for both setting and releasing a shutter mechanism. A still further object of my invention is to provide a shutter in which double-ended type of shutter blades are used which are swung about their pivots in one direction for making one exposure and in a second direction for making the next exposure and to provide a driving mechanism which may always be set by moving a setting lever in one direction. A still further object is to provide a suitable means for driving the shutter blades in opposite directions from a rotatable driver which is turned step by step in one direction. Other objects will appear from the following specification, the novel features being particularly pointed out in the claims at the end thereof.

In shutters of the between-the lens type it is well known that the fastest exposures can be obtained with shutter blades which move in only one direction and which are so shaped that the first part of the movement opens an exposure aperture and the second part of the movement closes the exposure aperture without reversing the direction of movement of the shutter blades. Such mechanisms are, however, usually more complicated and it is more difficult to apply a simple drive mechanism to such a shutter blade movement because of the necessity of reversing the direction of the drive.

In my copending application for shutter drive mechanism, Serial No. 528,415, filed March 28, 1944, I have shown a simple type of oscillatable shutter drive mechanism and the present invention is for an improvement over the shutter drive shown in my copending application, differing primarily in that in the present application I utilize a driving member which turns in one direction one step or one cycle at a time to drive the shutter blades first in one direction and then in the other direction as required for the blade and blade ring structure.

Coming now to the drawings wherein like reference characters denote like parts throughout:

For convenience I have shown my improved shutter drive as applied to a shutter including a blade mechanism of the type shown in the copending application for Camera shutter, Serial No. 489,484, in the name of Carl C. Fuerst. In this shutter blade mechanism two blade rings are used, these blade rings being movable simultaneously and in opposite directions to rock shutter blades in one direction for making one exposure and in a reverse direction for making the next exposure. Such a shutter blade mechanism is particularly adapted for use with my present invention.

Figure 1:
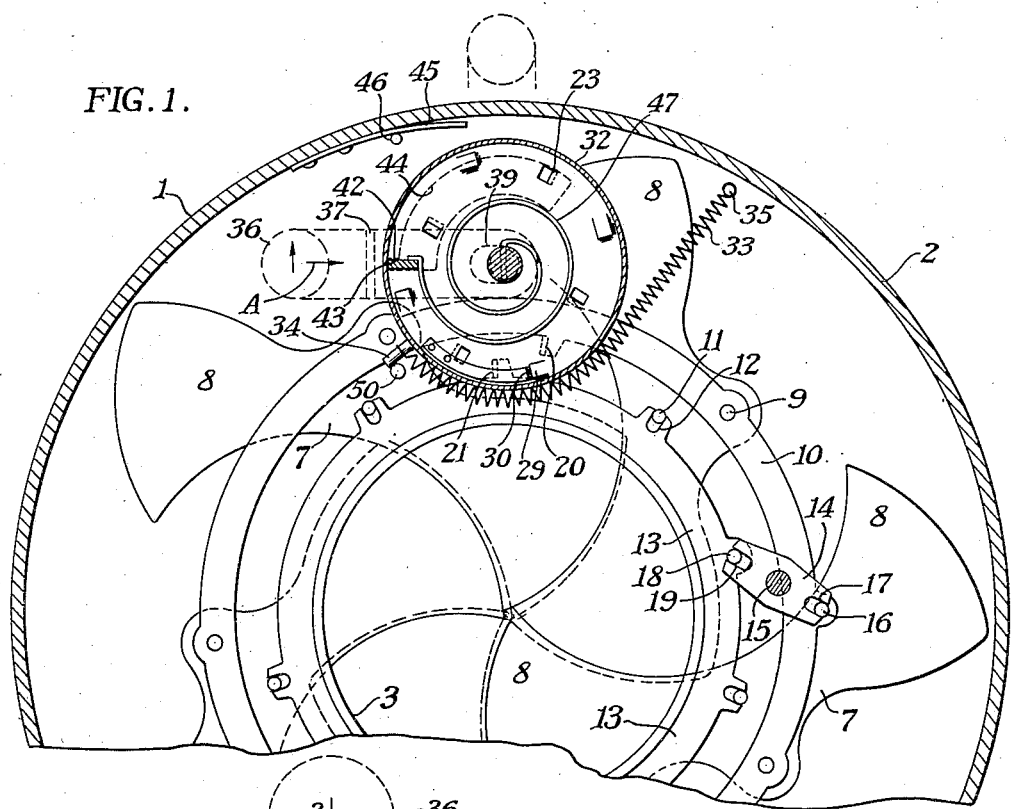
Fig. 1 is a fragmentary rear elevation of a shutter drive constructed in accordance with and embodying a preferred form of my invention, the parts being shown in a rest or unset position.
Figure 12:
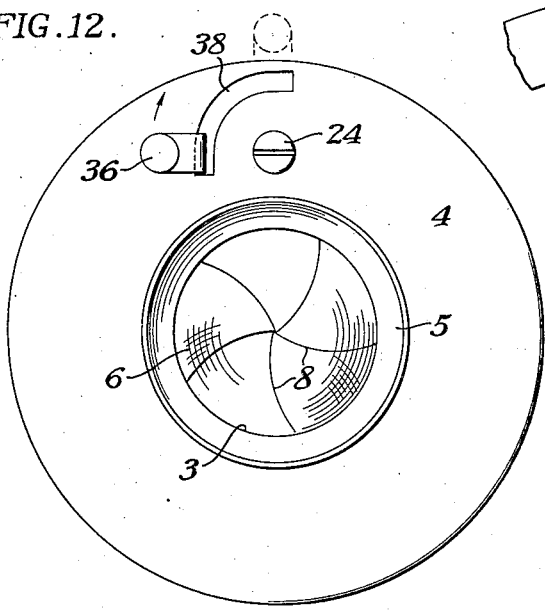
Fig. 12 is a front plane view of a shutter including my improved rotary driver.

As indicated in Fig. 1, the shutter may include a shutter casing 1 having an upstanding flange 2 around the periphery and a center shutter opening or exposure aperture 3 through which light may pass in making an exposure. A cover plate 4, as indicated in Fig. 12, may carry a lens cell 5 for the front lens of an objective 6.

The shutter leaves may be as shown in the Fuerst application, these shutter blades 7 being of the double-ended type in which there are similar shaped ends 8 either one of which may be positioned across the exposure aperture 3. Each of the shutter blades 7 is pivoted to one of the blade rings, here shown as pivotally connected at 9 to the outer blade ring 10 and having a pin 11 and slot 12 connection with an inner blade ring 13. The blade rings 10 and 13 are connected by a rocker arm 14 pivoted at 15 to the shutter casing and having a pin 16 and slot 17 connection with the blade ring 10 and having a pin 18 and slot 19 connection with the inner blade ring 13. Thus, when one blade ring is moved in one direction the rocker arm 14 will move the opposite blade ring in an opposite direction. This part of the structure is shown in the Fuerst application above referred to.

Figure 5:
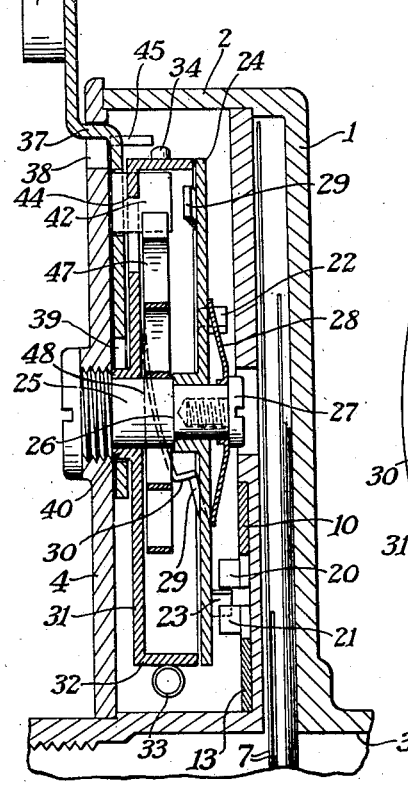
Fig. 5 is an enlarged sectional view taken on line 5—5 of Fig. 2.
Figures 6, 7:
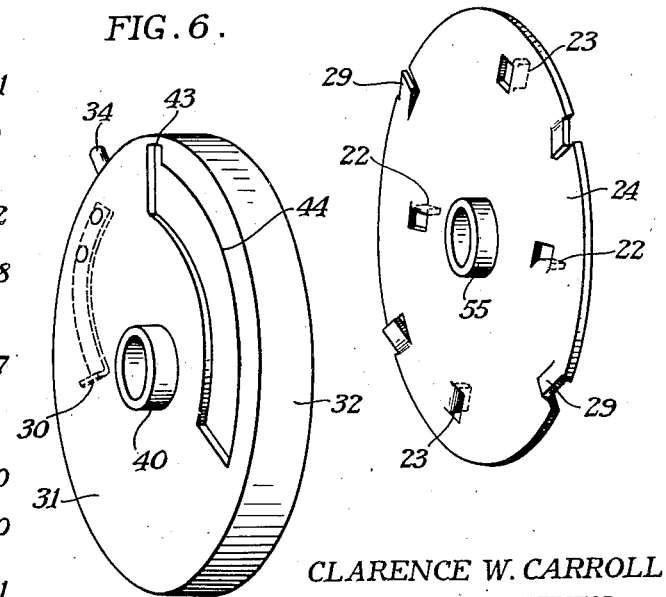
Fig. 6 is an enlarged perspective view of the master member.
Fig. 7 is a similar enlarged perspective view of the rotary shutter driver.
Figure 8:
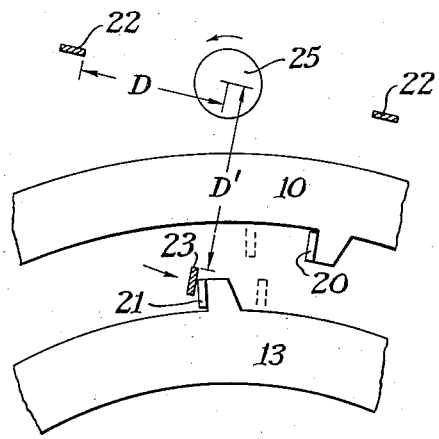
Fig. 8 is a diagrammatic view showing the relationship of a rotary driving lug to a blade ring driving protuberance when positioned to drive the inner blade ring, the parts being shown at the start of the driving movement.
Figure 9:
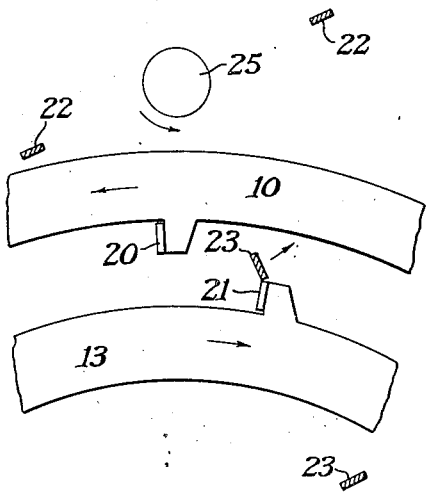
Fig. 9 is a similar view but with the parts shown at the end of the driving movement.
Figure 10:
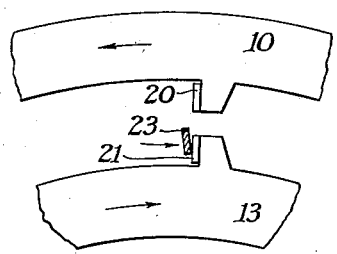
Fig. 10 is a view similar to Fig. 8 but showing the position of the parts midway between the position illustrated in Figs. 8 and 9, the position the blade rings will assume when the blades are open.
Figure 11:
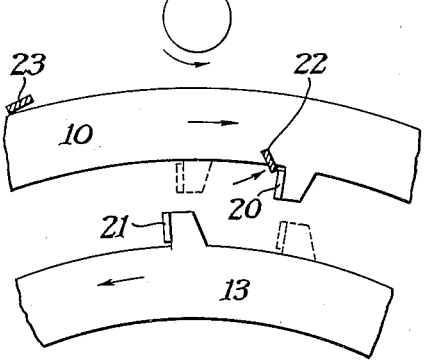
Fig. 11 is a view similar to Fig. 8 but with the rotary driver in position to drive the outer blade ring.

In order to drive the blade rings a pair of blade ring driving protuberances are formed as by bending upwardly a portion of a flange so as to form the driving protuberance 20 on the blade ring 10 and the driving protuberance 21 on the blade ring 13. Referring to Figs. 8 to 11, it will be noticed that the driving protuberances 21 and 20 will move in arcuate paths, since they form a part of the blade rings 10 and 13 which are oscillated in such paths, and that these protuberances may be moved by the driving lugs 22 and 23 which are only diagrammatically shown in these figures but which are driven by a rotary driving member 24, best shown in Fig. 7, which may turn upon a stud 25 as shown in Fig. 5. The driving lugs 22 are spaced a distance D from the center of the stud 25 which is so selected that a driving lug 22 will intersect the path of and move the blade ring protuberance 20 on the blade ring 10. The driving lugs 23 are spaced a distance D' from the center of the stud 25 which is selected so that a driving lug 23 will intersect the path of and move the driving protuberance 21 of the blade ring 13. By arranging the driving lugs in pairs so that each successive lug will engage the proper driving protuberance, the continued rotation of the rotary drive member 24 through an equal angle at each cycle will cause first one blade ring and then the other blade ring to be successively driven so that the shutter blades 7 may be driven in one direction for one exposure and in an opposite direction for the next exposure while the rotary drive member 24 is only being turned in a single direction. While it is possible to use any even number of driving lugs 22 and 23, I have found four a convenient number and when this number is used the rotary driver 24 needs to be turned 90° at each actuation. With the present shutter design the rotary drive member turns in a counterclockwise direction to operate the shutter leaves.

The rotary drive member 24, as best shown in Fig. 5, is mounted on the stud 25 and may turn freely thereon and, in addition, may slide between the shoulder 26 on the stud 25 and the screwhead 27 also carried by the stud. A spring 28 normally holds the rotary driver in the position shown.

In addition to the driving lugs 22 and 23 formed out of the rotary driver 24, I provide ratchet teeth 29 which may also be formed from the metal plate so that these ratchet teeth are equally spaced and are the same in number as the driving lugs. The reason for this is that these teeth are so arranged that they may contact with a spring pawl 30 carried by the master member 31 which is a shallow cup-shaped member with a flange 32 extending around its periphery. This flange supports a driving spring 33 which may be partially wrapped around the flange and which may be attached to a pin 34 carried by the master member at one end and at the other end to a pin 35 carried by the shutter. This spring tends to rotate the master member in a counterclockwise direction and when it does so, the master member may drive the rotary drive member 24 in the manner which will be hereinafter described.

Figure 2:
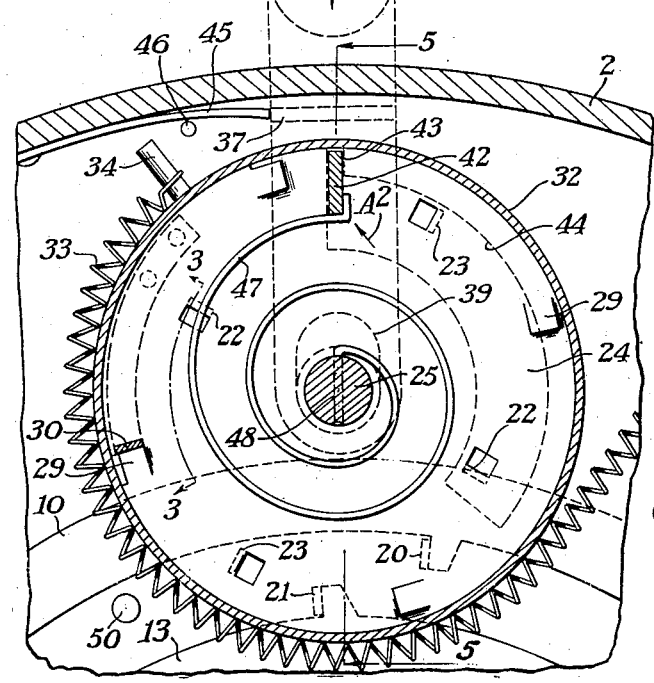
Fig. 2 is an enlarged fragmentary part-sectional view showing a portion of the shutter drive mechanism in a set position.
Figure 3:
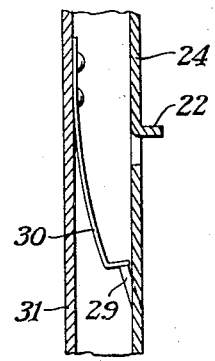
Fig. 3 is an enlarged sectional view taken on line 3—3 of Fig. 2.
Figure 4:
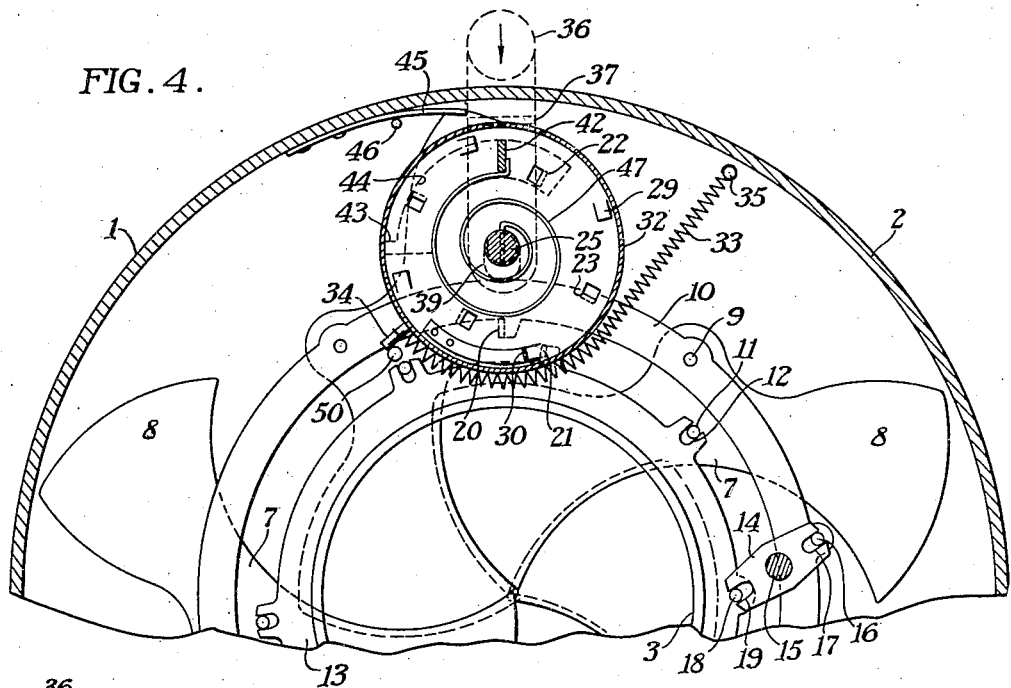
Fig. 4 is a view similar to Fig. 1 with the shutter parts in a released position.

The master member 31 has a normal position of rest (best shown in Fig. 1) in which the shutter is in the position it assumes after an exposure has been completed. The master member has a second set position shown in Fig. 2 in which the master member spring 33 is under tension and the shutter is in a position to be released to make an exposure. In order to set the shutter, I provide a setting lever 36 (shown in Figs. 5 and 12) which is formed on the end of a bent lever 37 which passes through a slot 38 in the shutter cover 4 and which limits the possible movement of this lever. The bent lever 37 is provided with a slot 39 which slides about the stud 25 on the outside of the sleeve 40 carried by the master member, this slot permitting radial movement of the lever 37 and also permitting the handle 36 to be moved as indicated in Fig. 12 in a clockwise direction about the stud 25 to set the shutter. With the parts in the position shown in Fig. 1, it will be noted that an upturned flange 42 on the bent lever 37 is engaged in a notch 43 in the end of a slot 44 cut in the master member so that when the handle 36 is moved in the direction shown by the arrow in Fig. 1, it turns the master member upon the stud 25, tensioning the spring 33. When the parts reach the Fig. 2 position the bent lever 37 of the setting lever is engaged by a spring 45 which holds the setting lever 36 in its operative or set position. The spring 45 is limited in its downward movement by a pin 46 but when the setting lever 36 reaches the Fig. 2 position the spring snaps down behind the bent lever 37, holding the master member through the engagement of the flange 42 with the notch 43 at the end of slot 44 in position for exposure. It will be noticed that a spring 47, which has one end 48 anchored on the stud 25, exerts a thrust on the lug 42 in the direction shown by the arrow $A^2$ in Fig. 2. That is, the thrust is both outwardly and in a counterclockwise direction. When it is desired to release the master member, the setting lever handle 36 is moved radially toward the stud 25 as indicated by the arrow $A^3$ in Fig. 2, thus disengaging the flange 42 from the holding notch 43 and permitting the master member to turn rapidly in a counterclockwise direction. This movement causes the pawl 30 to move the rotary drive plate 24 through engagement with one of the ratchet teeth 29 until the pin 34 carried by the master member strikes the stop pin 50, as shown in Fig. 4, at which time the rotary drive member 24 has been turned through 90°.

The rotary drive member 24 can only be turned in one direction because of the friction spring 28 which holds the cylindrical hub 55 against a shoulder 26 of the stud 25. If desired, this spring may have a slight protuberance which may snap into small apertures or "dimples" in the rotary drive member 24, but I prefer to avoid this if possible because it adds friction which must be overcome at the start of the driving movement which is undesirable because it may tend to slow down the opening movement of the shutter.

With my improved shutter the operation is extremely simple. Referring to Fig. 12, the setting lever 36 is turned clockwise through 90° to set the master member 31, tensioning its spring 33. During this movement the spring latch 30 leaves one ratchet tooth 29 and slides idly over the surface of the rotary driver 24 until it reaches a second ratchet tooth 29 and snaps behind such tooth as indicated in Fig. 5. The shutter is now ready for an exposure. An operator then presses the setting handle 36 in a radial direction as indicated by the arrow in Fig. 2. This movement releases the latch which holds the shutter in a set position, this latch being formed by the flange 42 of the lever 37 and by the notch 43 in the end of the slot 44 of the master member. Consequently, the master member can now turn rapidly passing the slot about the flange 42 and, when an operator releases the handle 26, the spring 47 will turn it around, passing the lug 42 through the slot 44 and finally causing the flange 42 to engage the holding slot 43 when the position shown in Fig. 12 is reached. When in this position the shutter is ready to be actuated a second time. Assuming that the driving lug 23 has been used to drive the blade ring 13 during the operation just completed, the next actuation of the shutter will be by a driving lug 22 which is closer to the center of the stud 25 than the driving lug 23. Consequently, the second driving lug 22 will strike and turn the opposite blade ring 10, thus causing the shutter blades to swing in a clockwise direction for one exposure and in a counterclockwise direction for the next exposure. By providing an equal number of driving lugs 22 and 23 successively spaced close to or farther away from the stud 25 each cycle of operation of the driving member 24 will cause the shutter blades to function as above described.

I am aware that driving members have been used for shutters in which pins or lugs engage a swinging arm to operate shutter blades, but so far as I am aware no one has provided a rotary driving member which would drive two different blade rings, first one and then the other, to turn the shutter blades first clockwise and then counterclockwise, while the driving member turns only by single space or cycles in one direction.

While I have described and illustrated a preferred embodiment of my invention, it is obvious that various modifications of my driving structure will be suggested to those skilled in the art. I consider as within the scope of my application all such forms as may come within the scope of the appended claims.

What I claim is:

1. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver, means carried by the master member for moving the rotary driver one step in a driving direction by the master member, driving lugs on the driver adapted to engage and drive one blade ring in one direction to produce one exposure, and a second series of lugs on the driver adapted to engage the other blade ring and drive it in the same direction in the next successive operation of the rotary driver to produce a succeeding exposure.

2. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver coaxial with the master member, means for moving the rotary driver one step in a driving direction by the master member, driving lugs on the driver adapted to engage and drive one blade ring in one direction to produce an exposure, and a second series of lugs on the driver adapted to engage the other blade ring and drive it in the same direction in the next successive operation of the rotary driver to produce a succeeding exposure and means for limiting the movement of the rotary driver to movement in one direction.

3. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver coaxial with the master member, means for moving the rotary driver one step in a driving direction by the master member, driving lugs on the driver adapted to engage and drive one blade ring in one direction to produce one exposure, and a second series of lugs on the driver adapted to engage the other blade ring and drive it in the same direction in the next successive operation of the rotary driver to produce a succeeding exposure.

4. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver pivotally mounted adjacent the blade rings, driving protuberances carried by the blade rings adapted to move therewith through an arcuate path, driving lugs carried by the rotary driver to engage said protuberances, said lugs being so arranged that one lug may engage and drive one ring to produce an exposure when the master member is first released, and the next lug may engage and drive the other ring to produce a succeeding exposure upon the second release of the master member.

5. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver coaxial with the master member, pivotally mounted adjacent the blade rings, driving protuberances carried by the blade rings adapted to move therewith through an arcuate path, driving lugs carried by the rotary driver moving through an oppositely curved path from that of the driving protuberances, means for moving the rotary driver one driving step at a time from the master member including interengaging teeth on the master member and rotary driver, whereby one lug may engage and drive one blade ring to produce an exposure and upon a successive release of the master member another lug may engage and drive the other blade ring in the same direction to produce a second exposure.

6. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver pivotally mounted adjacent the blade rings, driving protuberances carried by the blade rings adapted to move therewith through an arcuate path, driving lugs carried by the rotary driver to engage a protuberance and to move one ring to produce an exposure when the master member is first released from the set position, and to engage a protuberance and move the other ring to produce a succeeding exposure after the master member is reset and released a second time, said lugs being differentially spaced from the pivot of the driver for the purpose set forth, means carried by the master member for moving the rotary driver in one direction, and means for latching the master member in set position and releasing said master member.

7. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver, pivotally mounted adjacent the blade rings, driving protuberances carried by the blade rings adapted to move therewith through an arcuate path, driving lugs carried by the rotary driver to engage said driving protuberances, said lugs being differentially spaced from the pivotal center of the driver in such manner that one lug may move one ring in one direction to produce an exposure when the master member is first released and the next lug may move the other ring in the same direction when the master member has been reset and released to produce a succeeding exposure, means for preventing movement of the driver in one direction, and a latch for the master member releasable by a sliding movement of the setting lever in a direction transverse to the axis of the pivotal mounting.

8. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver, means for moving the rotary driver one step in a driving direction by the master member, comprising interengaging teeth on the master member and rotary driver, a common pivotal support for the rotary driver and master member, a spring normally holding the interengaging teeth in driving engagement and lugs on the driver differentially spaced from the center of the pivotal support, some of said lugs being adapted to engage one blade ring to drive it in one direction upon one release of the master member and others of said lugs being adapted to engage the other blade ring to drive it in the same direction upon the second release of the master member, so that each engagement of a lug with a ring produces one exposure during any one of said steps.

9. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver having lugs adapted to engage either blade ring, means for moving the rotary driver one step in a driving direction by the master member, comprising interengaging teeth on the master member and rotary driver, a common pivotal support for the rotary driver and master member, on which the master member may oscillate and on which the setting lever may both turn and slide, a spring tending to return the setting lever to normal position, a driving spring tending to move the master member to normal position and thereby to actuate the rotary driver to engage a blade ring for producing an exposure, and means whereby a sliding movement of the setting lever may release the master member.

10. A photographic shutter having a casing, a master member pivotally mounted therein, a setting lever for moving the master member to a set position for operating the shutter, shutter blades pivotally mounted for movement to and from a light obscuring position, blade rings for moving the shutter blades, a rotary driver for driving the blade rings from the master member, a single pivot supporting the master member and setting lever, a slot in the setting lever permitting radial movement of the setting lever, and a latch for holding the master member in a set position, said latch being releasable by radial movement of the setting lever, whereby said setting lever may be swung upon the pivot for setting the shutter and may be slid upon the pivot for tripping the shutter.

11. A photographic shutter having a casing, a master member pivotally mounted therein, a pivotally mounted setting lever for moving the master member to a set position for operating the shutter, shutter blades pivotally mounted for movement to and from a light obscuring position, blade rings for moving the shutter blades, means for driving the blade rings from the master member, a pivot common to the master member and setting lever, a slot in the setting lever permitting radial movement of the setting lever, and a latch for holding the master member in a set position, said latch being releasable by radial movement of the setting lever, whereby said setting lever may be swung upon the pivot for setting the shutter and may be slid upon the stud for tripping the shutter, a pin and slot connection between the setting lever and the master member including a driving notch at one end of the slot, and a spring tending to engage the setting lever in the driving notch, said spring being shaped to also tend to hold the setting lever at one end of said slot, one end of said spring being carried by said master member and the other end of said spring being attached to the rotary driver supporting pivot.

12. A photographic shutter having a casing, a master member movably mounted therein, a pivotally mounted setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver, means for moving the rotary driver one step in a driving direction by the master member, a series of lugs on the driver spaced so that one lug may engage one blade ring during one operation of the shutter and the next lug may engage the other blade ring during the next operation of the shutter, said lugs being arranged to move with the driver in an arcuate path non-coincident with the blade rings a distance sufficient to fully move the engaged ring as required to open and close the shutter blades with a uni-directional movement.

13. A photographic shutter having a casing, a master member movably mounted therein, a setting lever for moving the master member to a set position for operating the shutter, shutter blades of the double-ended type movably mounted in the shutter casing, a pair of concentric blade rings carrying said shutter blades, means for moving said blade rings in opposite directions to move the shutter blades to make an exposure, a rotary driver, means for moving the rotary driver one step in a driving direction by the master member, driving lugs on the driver arranged in two pairs, alternate lugs being positioned to successively engage first one blade ring on one operation of the shutter and then the other blade ring on the next operation of the shutter, equally spaced teeth on the rotary driver for engagement by the master member, and means for moving the master member a distance to move the rotary driver a distance equal to the spacing of the driving lugs at each setting of the shutter.

14. A photographic shutter having a casing, a spring-driven master member arranged for rotation about a pivot, a setting lever also rotatable about said pivot to set the master member by an arcuate movement of said lever and to release the master member by a sliding movement of said lever on said pivot, concentric blade rings coupled together for opposite simultaneous movement, double-ended symmetrical shutter blades adapted to produce one exposure by a clockwise movement and to produce the next succeeding exposure by a counterclockwise movement, connections between the blades and the rings whereby a movement of either ring may operate the blades as aforesaid, a rotary driver coaxial with the master member and movable by the latter to drive either of said blade rings in one direction, lugs on the driver adapted to move in a path intersecting the path of the blade rings, said lugs being so located that one may engage and move one blade ring on the first release of the master member and the next lug may engage and move the other ring on the next release of the master member.

15. A photographic shutter having a casing, a spring-driven master member, a setting lever for setting the master member, concentric blade rings coupled together for opposite movement, double-ended symmetrical shutter blades connected with said rings in such a manner that movement of either ring in one direction may produce an exposure, a rotary driver movable by the master member when the latter is released, and means carried by the driver adapted to engage and move one blade ring during the first release movement of the master member to produce one exposure and to engage and move the other blade ring during the next release movement of the master member to produce a succeeding exposure.

16. A photographic shutter having a casing, a spring-driven master member arranged for limited rotation about an axis, a setting lever for setting the master member, a pair of concentric blade rings coupled together for opposite movement, a series of double-ended symmetrical shutter blades adapted to be opened and closed by a movement of either blade ring in a single direction, a rotary driver coaxial with and movable by the master member when the latter is released, and means carried by the driver adapted to move one blade ring to produce an exposure during one release movement of the master member, and to move the other blade ring to produce a succeeding exposure during the next release movement of the master member.

17. A photographic shutter having a casing, a spring-driven master member arranged for limited rotation about a pivot, a setting lever for setting the master member, a pair of concentric blade rings coupled together for opposite movement, a series of symmetrical shutter blades adapted to produce an exposure by a uni-directional movement either clockwise or counterclockwise, connections between said blades and said rings whereby a movement of either ring in one direction may move the blades as aforesaid, a rotary driver coaxial with the master member and adapted to be rotated thereby when said master member is released, and means carried by the rotary driver adapted to selectively engage and move a required blade ring during any release movement of the master member.

18. A shutter constructed according to claim 8 wherein means are provided for preventing reverse rotation of the driver.

19. A shutter constructed according to claim 8 wherein the setting lever has an arcuate movement to set the master member and a sliding movement to release the master member.

20. A photographic shutter having a casing, a master member pivotally mounted therein, a rotary driver coaxial with the master member and adapted to be rotated thereby when the master member is released, a pair of coupled blade rings, double-ended shutter blades connected with said rings in such manner that movement of either ring in one direction produces an exposure, lugs on the rotary driver arranged alternately closer to and more remote from the center thereof, said lugs being spaced so that upon release of the master member one lug engages and drives one blade ring and upon the next release of the master member the next lug engages and drives the other blade ring in the same direction, each of said driving operations producing one exposure.

21. A photographic shutter having a casing, a spring-driven master member pivotally mounted therein, a setting lever and a rotary driver both mounted coaxially with the master member, a pair of coupled blade rings and a set of double-ended shutter blades operable thereby, lugs on the driver adapted to engage either ring when the master member is released to produce an exposure, and a latch for holding the master member in set position, said latch being releasable by a sliding movement of the setting lever, transversely of the coaxial mounting, a pin-and-slot connection between the setting lever and the master member including a driving notch at one end of the slot, and a spring tending to move the setting lever to engage the notch.

CLARENCE W. CARROLL.